(12) United States Patent
Lin et al.

(10) Patent No.: US 7,213,637 B2
(45) Date of Patent: May 8, 2007

(54) HEAT PIPE OPERATING FLUID, HEAT PIPE, AND METHOD FOR MANUFACTURING THE HEAT PIPE

(75) Inventors: Jhy-Chain Lin, Tu-Cheng (TW); Ga-Lane Chen, Fremont, CA (US)

(73) Assignee: Hon Hai Precision Industry Co., Ltd., Tu-Chen City, Taipei Hsien (TW)

( * ) Notice: Subject to any disclaimer, the term of this patent is extended or adjusted under 35 U.S.C. 154(b) by 0 days.

(21) Appl. No.: 10/950,083

(22) Filed: Sep. 24, 2004

(65) Prior Publication Data

US 2005/0092467 A1 May 5, 2005

(30) Foreign Application Priority Data

Oct. 31, 2003 (TW) .............................. 92219406 U

(51) Int. Cl.
*F28D 15/00* (2006.01)
*H05K 7/20* (2006.01)

(52) U.S. Cl. .............................. 165/104.26; 165/104.21

(58) Field of Classification Search ........... 165/104.21, 165/104.26, 80.4; 361/699, 700; 257/714, 257/715; 174/15.2; 252/71, 73; 62/3.7
See application file for complete search history.

(56) References Cited

U.S. PATENT DOCUMENTS

| | | | |
|---|---|---|---|
| 5,947,193 A | | 9/1999 | Adkins et al. |
| 6,432,320 B1 * | 8/2002 | Bonsignore et al. | ........... 252/70 |
| 6,447,692 B1 * | 9/2002 | Momoda et al. | ............... 252/70 |
| 6,478,997 B2 * | 11/2002 | McCullough | ............... 264/108 |
| 2003/0141045 A1 * | 7/2003 | Oh et al. | ............... 165/104.26 |
| 2004/0182099 A1 * | 9/2004 | Hsu | ........................ 62/259.2 |
| 2004/0194944 A1 * | 10/2004 | Hendricks et al. | .......... 165/181 |
| 2004/0238799 A1 * | 12/2004 | Hwang et al. | .............. 252/511 |
| 2005/0056808 A1 * | 3/2005 | Leu et al. | ..................... 252/71 |
| 2005/0238810 A1 * | 10/2005 | Scaringe et al. | ......... 427/249.1 |

* cited by examiner

*Primary Examiner*—Tho Duong
(74) *Attorney, Agent, or Firm*—Morris Manning & Martin LLP; Tim Tingkang Xia, Esq.

(57) ABSTRACT

A heat pipe (20) includes a pipe (21), a wick (22), and an operating fluid. The wick is a capillary structure including a carbon nanotube layer, and is fixed to an inside wall of the pipe. The operating fluid is sealed in the pipe and soaks into the wick. The operating fluid includes a pure liquid, and a plurality of nanometer-scale particles uniformly suspended in the pure liquid. The nanometer-scale particles can be carbon nanocapsules (30) or particles of a metal (32) with high thermal conductivity. Each carbon nanocapsule can further have a metal with high thermal conductivity filled therein. The carbon nanotube layer contains carbon nanotubes of small size and high thermal conductivity, therefore the capillary performance of the wick is good. Further, because the operating fluid includes nanometer-scale particles with high thermal conductivity, this ensures that the operating fluid has high thermal conductivity.

11 Claims, 2 Drawing Sheets

HEAT PIPE OPERATING FLUID, HEAT PIPE, AND METHOD FOR MANUFACTURING THE HEAT PIPE

BACKGROUND OF THE INVENTION

1. Field of the Invention

The invention relates generally to thermal transmitting structures, and more particularly to a heat pipe having an operating fluid and a method for manufacturing the heat pipe.

2. Description of the Prior Art

Electronic components such as semiconductor chips are becoming progressively smaller, while at the same time heat dissipation requirements thereof are increasing. In many contemporary applications, a heat pipe is one of the most efficient systems in use for transmitting heat away from such components.

Referring to FIG. 4, a typical heat pipe 10 is a vessel that comprises a pipe 11, a wick 12, and a precise amount of liquid operating fluid 13. The wick 12 is a capillary structure, and is fixed to an inside wall (not labeled) of the pipe 11. The liquid operating fluid 13 is sealed in the pipe 11 and soaks the wick 12. One end of the heat pipe 10 is an evaporator section, and the other end of the heat pipe 10 is a condenser section. The evaporator section is disposed in thermal communication with an external heat source, while the condenser section is disposed in thermal communication with an external heat sink. Further, an adiabatic section connects the evaporator section to the condenser section, with heat being transmitted within the heat pipe 10 from the evaporator section to the condenser section through the adiabatic section.

An operating principle of the heat pipe 10 is as follows. Liquid operating fluid 13 is originally located in the evaporator section of the heat pipe 10. A heat source such as ambient hot air transmits heat 15 by conduction through the wall of the heat pipe 10 to the liquid operating fluid 13, and the temperature of the liquid operating fluid 13 rises. When the temperature of the liquid operating fluid 13 is equal to a temperature at which the liquid operating fluid 13 changes from the liquid state to a vapor state, the provision of additional heat 15 transforms the liquid operating fluid 13 into vaporized operating fluid 14. Vapor pressure drives the vaporized operating fluid 14 through the adiabatic section to the condenser section of the heat pipe 10. At the condenser section, the vaporized operating fluid 14 transmits the heat 15 absorbed in the evaporator section to a heat sink (not shown) located at the condenser section, and the vaporized operating fluid 14 is thereby transformed back into liquid operating fluid 13. Capillary action of the wick and/or gravity moves the liquid operating fluid 13 back to the evaporator section. The heat pipe 10 continues this cyclical process of transmitting heat 15 as long as there is a temperature differential between the evaporator section and the condenser section, and as long as the heat 15 is sufficient to vaporize the liquid operating fluid 13 at the evaporator section.

In order to ensure the effective operation of the heat pipe 10, the wick 12 must has good capillary performance, so that the operating fluid 13 can be distributed uniformly therethrough. U.S. Pat. No. 6,478,997 discloses a heat pipe adopting carbon fibers as a wick. The carbon fibers have high thermal conductivity and low cost. The size of the carbon fibers is not apparent from the disclosure. If the carbon fibers are large, the capillary performance of the wick 12 is likely to be poor. This retards the vaporized operating fluid being condensed back to its liquid state, and also retards the liquid operating fluid returning to the evaporator section. Any heat pipe adopting carbon fibers should not employ large fibers, otherwise poor thermal conductivity is likely.

Conventional heat pipes generally adopt pure liquids as their operating fluids. U.S. Pat. No. 5,947,193 discloses such kind of heat pipe. The heat pipe comprises a precise amount of operating fluid. The operating fluid is selected from the group consisting of pure alcohol, freon, water and acetone. However, for many applications, the thermal conductivities of these operating fluids are too low. The rate of heat transmission is too slow, and the operating efficiency of the heat pipe is unsatisfactory.

A new heat pipe which overcomes the above-mentioned problems is desired.

BRIEF SUMMARY OF THE INVENTION

Accordingly, an object of the present invention is to provide an operating fluid having high thermal conductivity.

Another object of the present invention is to provide a heat pipe having the above-described operating fluid and comprising a wick with good capillary performance.

A further object of the present invention is to provide a method for manufacturing the above-described heat pipe.

To achieve the first of the above-mentioned objects, the present invention provides a pure liquid and a plurality of nanometer-scale particles uniformly suspended in the pure liquid. The nanometer-scale particles can include any two or more of a carbon nanocapsule, a carbon nanocapsule with metal filled therein, and a metal particle. The metal filled in the carbon nanocapsule has high thermal conductivity. Each carbon nanocapsule is a polyhedral carbon cluster.

To achieve the second of the above-mentioned objects, the present invention provides a heat pipe comprising a pipe, a wick, and the above-described operating fluid. The wick is a capillary structure comprising a carbon nanotube layer, and is fixed to an inside wall of the pipe. The operating fluid is sealed in the pipe and soaks into the wick.

To achieve the third of the above-mentioned objects, a method for manufacturing the above-described heat pipe comprises the steps of:

(a) providing a pair of rectangular metal plates, each metal plate comprising a pair of side walls extending therefrom;

(b) attaching a carbon nanotube layer to an inner wall of each metal plate, in order to provide a wick having a capillary structure;

(c) sintering corresponding side walls of the metal plates together using a nanometer-scale metal powder in order to form a pipe; and (d) forming a vacuum in the pipe, adding the above-described operating fluid into the pipe, and hermetically sealing the pipe.

Compared with a conventional heat pipe, the heat pipe of the present invention has the following advantages. Firstly, because the wick is a capillary structure comprising a carbon nanotube layer, and each carbon nanotube has a small size and high thermal conductivity, the capillary performance of the wick is good. This ensures that vaporized operating fluid is condensed back to its liquid state fast, and further ensures that the liquid operating fluid returns to an evaporator section of the heat pipe fast. Secondly, because the operating fluid comprises nanometer-scale particles with high thermal conductivity, this ensures that the operating fluid has high thermal conductivity, which further enhances the operating efficiency of the heat pipe.

Other objects, advantages and novel features of the invention will become more apparent from the following detailed description when taken in conjunction with the accompanying drawings, in which:

DESCRIPTION OF THE PREFERRED EMBODIMENT

Figure 1:
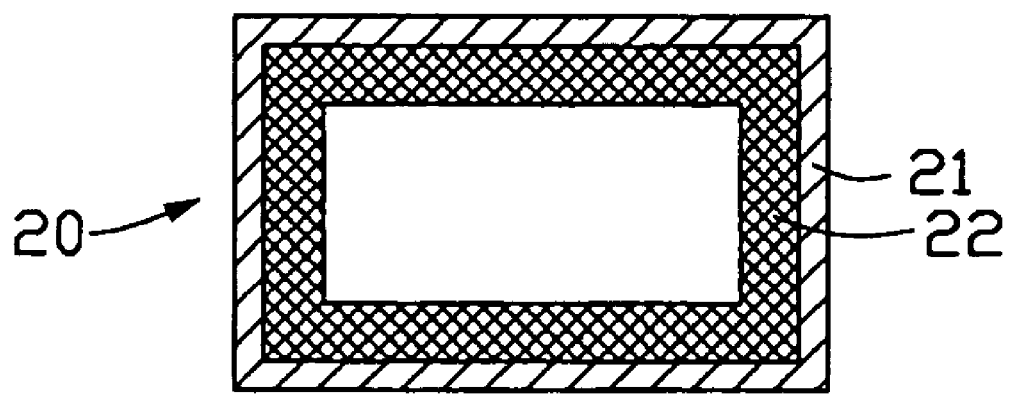
FIG. 1 is a cross-sectional view of a heat pipe of the present invention.

Referring to FIG. 1, a heat pipe 20 of the present invention comprises a pipe 21, a wick 22, and an operating fluid (not labeled). The wick 22 is a capillary structure comprising a carbon nanotube layer, and is fixed to an inside wall of the pipe 21. The operating fluid is sealed in the pipe 21 and soaks into the wick 22.

The pipe 21 is a metal tube. A material of the pipe 21 can be selected from the group consisting of copper, aluminum, steel, carbonic steel, stainless steel, iron, nickel, titanium, and any alloy thereof. A cross-section of the pipe 21 is circular, elliptical, square, triangular or rectangular. A width of the pipe 21 is in the range from 2 to 200 micrometers, and a length of the pipe 21 is in the range from several micrometers ($\mu$m) to several tens of meters (m). In the preferred embodiment of the present invention, the pipe 21 is a copper tube having a length of 80 micrometers. The cross-section of the pipe 21 is rectangular, and the cross-section has a width of 5 micrometers and a length of 10 micrometers.

The carbon nanotube layer of the wick 22 can comprise single-wall carbon nanotubes, multi-wall carbon nanotubes, or a mixture thereof. A thickness of the carbon nanotube layer is in the range from 100 nanometers to 100 micrometers.

Figure 2:
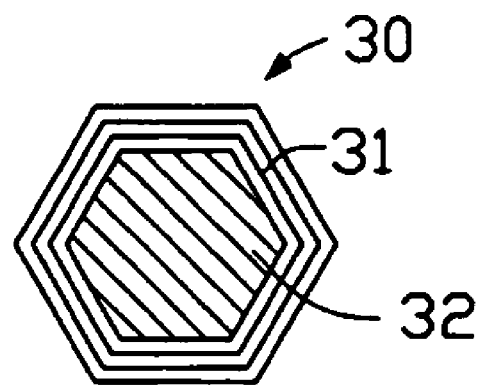
FIG. 2 is an enlarged, cross-sectional view of a carbon nanocapsule contained in an operating fluid of the heat pipe of FIG. 1.

Referring to FIG. 2, in the preferred embodiment, the operating fluid for the heat pipe 20 is a suspension, comprising pure water and a plurality of carbon nanocapsules 30 uniformly suspended in the pure water. A mass of the carbon nanocapsules 30 is in the range from one percent to three percent of that of the operating fluid. Each carbon nanocapsule 30 is a polyhedral carbon cluster, with a metal 32 having high thermal conductivity filled therein. The polyhedral carbon cluster comprises a plurality of layers of graphite 31. The metal 32 can be selected from the group consisting of copper, aluminum, gold, silver, and any alloy thereof. A diameter of the carbon nanocapsule 30 is in the range from 20 to 60 nanometers.

In alternative embodiments, the carbon nanocapsules 30 with the metal 32 filled therein can be replaced by nanometer-scale particles of the metal 32, the carbon nanocapsules 30 without the metal 32 filled therein, or a mixture thereof. Furthermore, the pure water can be replaced by ammonia, methanol, acetone, or heptane.

Figure 3:
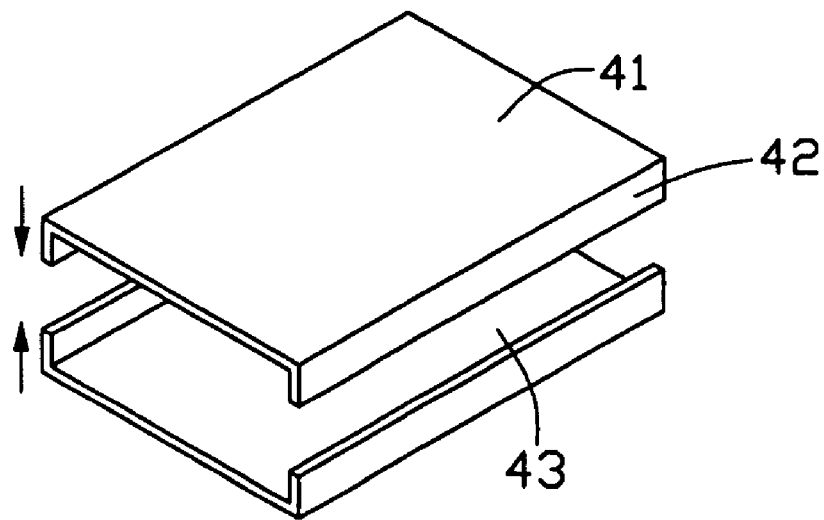
FIG. 3 is an isometric view of copper plates used to make a pipe of the heat pipe of FIG. 1.
Figure 4:
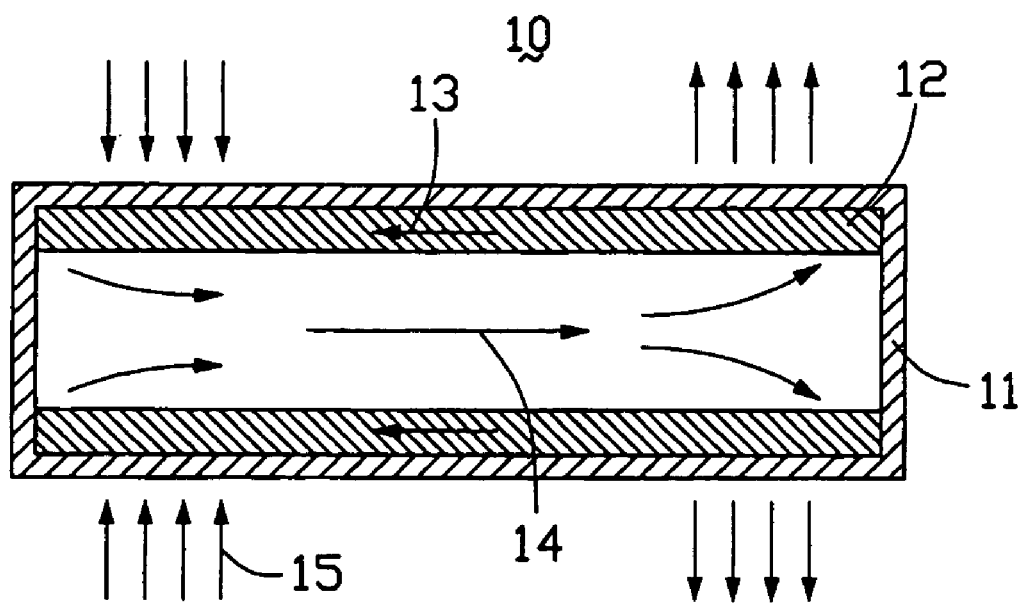
FIG. 4 is a cross-sectional view of a conventional heat pipe, showing an operating principle thereof.

A preferred method for manufacturing the heat pipe 20 is as follows. Referring to FIG. 3, firstly, a pair of rectangular copper plates 41 is provided. Each copper plate 41 comprises a pair of opposite side walls 42 extending therefrom. Secondly, a carbon nanotube layer is disposed on an inner wall 43 of each copper plate 41, in order to provide the wick 22 having the capillary structure. Thirdly, corresponding side walls 42 of the copper plates 41 are put into contact with each other edge-to-edge. The side walls 42 are integrally sintered together using a nanometer-scale copper powder, thereby forming the pipe 21. Fourthly, the air in the pipe 21 is pumped out to form a vacuum in the pipe 21, the operating fluid with carbon nanocapsules 30 is added into the pipe 21, and the pipe 21 is hermetically sealed.

Compared with a conventional heat pipe, the heat pipe 20 of the present invention has the following advantages. Firstly, because the wick 22 is a capillary structure comprising a carbon nanotube layer, and because carbon nanotubes are extremely small and have high thermal conductivity, the capillary performance of the wick 22 is enhanced. This ensures that vaporized operating fluid is condensed back to its liquid state fast, and further ensures that the liquid operating fluid is returned to an evaporator section of the heat pipe 20 fast. Secondly, because the operating fluid comprises nanometer-scale particles with high thermal conductivity, this ensures that the operating fluid has high thermal conductivity, which further enhances the operating efficiency of the heat pipe 20.

It is to be understood that the above-described embodiments are intended to illustrate rather than limit the invention. Variations may be made to the embodiments without departing from the spirit of the invention. Accordingly, it is appropriate that the appended claims be construed broadly and in a manner consistent with the scope of the invention.

What is claimed is:

1. A heat pipe comprising:
    a vacuumated pipe;
    a wick having a capillary structure engaged with an inside wall of the pipe; and
    an operating fluid sealed in the pipe and soaking the wick;
    wherein the wick comprises a carbon nanotube layer, and the operating fluid comprises a liquid and a plurality of nanometer-scale particles suspended in the liquid.

2. The heat pipe as claimed in claim 1, wherein the carbon nauotube layer comprises single-wall carbon nanotubes, multi-wall carbon nanotubes, or a mixture thereof.

3. The heat pipe as claimed in claim 1, wherein a thickness of the carbon nanombe layer is in the range from 100 nanometers to 100 micrometers.

4. The heat pipe as claimed in claim 1, wherein the nanometer-scale particles are carbon nanocapsules or metal particles with high thermal conductivity.

5. The heat pipe as claimed in claim 4, wherein each of the carbon nanocapsules comprises a metal with high thermal conductivity filled therein.

6. The heat pipe as claimed in claim 1, wherein a mass of the nanometer-scale particles is in the range from one percent to three percent of that of the operating fluid.

7. The heat pipe as claimed in claim 1, wherein a material of the pipe is selected from the group consisting of copper, aluminum, steel, carbonic steel, stainless steel, iron, nickel, titanium, and any alloy thereof.

8. The heat pipe as claimed in claim 1, wherein a cross-section of the pipe is circular, elliptical, square, triangular or rectangular.

9. A heat pipe comprising:
    a pipe capable of being vacuumed in an inner space thereof;

at least one nanotube layer formed at an inner wall of said pipe surrounding said inner space of said pipe so as to function as a wick in said pipe; and operating fluid installed in said inner space of said pipe, and capable of transmitting heat and flowing back and forth between two ends of said pipe based on status of said operating fluid through a selective one of said inner space of said pipe and said at least one nanotube layer.

10. The heat pipe as claimed in claim 9, wherein said operating fluid has a plurality of nanometer-scale particles suspended therein.

11. The heat pipe as claimed in claim 9, wherein said pipe is made by at least one metal plate for forming a flat outer side of said pipe.

* * * * *